Jan. 12, 1943. C. P. DEIBEL 2,307,769

DRY CELL BATTERY UNIT

Filed Dec. 13, 1941

INVENTOR.
Cyril P. Deibel
BY Fay, Macklin, Golrick, Williams
Chilton & Seley
ATTORNEYS Patented Jan. 12, 1943

2,307,769

UNITED STATES PATENT OFFICE 2,307,769

DRY CELL BATTERY UNIT

Cyril P. Deibel, Lakewood, Ohio

Application December 13, 1941, Serial No. 422,897

5 Claims. (Cl. 136—111)

This invention relates to a dry cell battery unit of the type commonly known as an "A" battery and which is made up of a plurality of cells arranged in stacked relation and connected in parallel, each cell comprising a mass of mix containing a carbon electrode, and a zinc electrode disposed over each mass of mix and having substantially the same surface area as the mass of mix, each zinc electrode being enclosed within a thin layer of battery paper, the stack of cells being enveloped within a thin layer of Pliofilm in liquid tight relation, the unit being provided with vent means for relieving excessive pressure without permitting the escape of the liquid contents of the cells and without permitting the ingress of outside air, the cells being held in intimate contact under pressure and the entire stack of cells being enclosed within an outer carton or casing having a hard seal in which the upper edge of the layer of Pliofilm is embedded.

One of the objects of the invention is to provide a dry cell battery unit of the character described which makes use of a maximum amount of active materials and a minimum amount of inactive materials as well as zinc.

Another object of the invention is to provide a dry cell battery unit of the character described which includes a zinc electrode in the form of a flat plate which is disposed between each mass of mix and which has substantially the same surface area as the mix and in which both sides of the plate are used, the entire stack of cells being hermetically sealed within a thin layer of Pliofilm and having vent means for relieving excessive pressure.

A further object of the invention is to provide a dry cell battery unit having the above described distinguishing features and characteristics and which is simple in construction and well adapted for quantity production with automatic and semi-automatic machinery.

Figure 1:
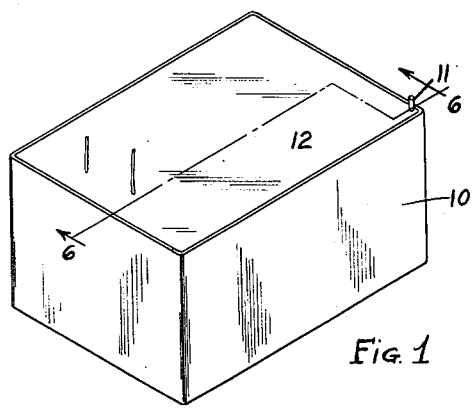
Figure 2:
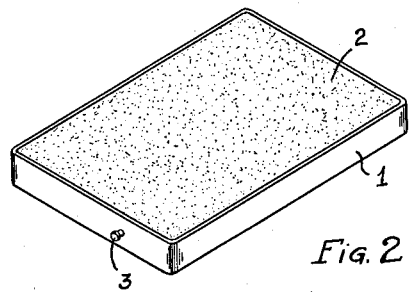
Figure 3:
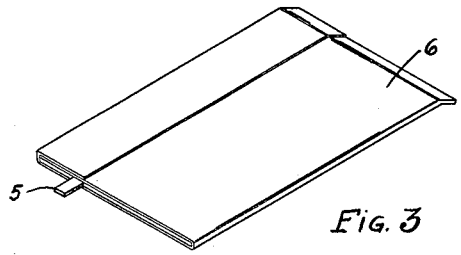
Figure 4:
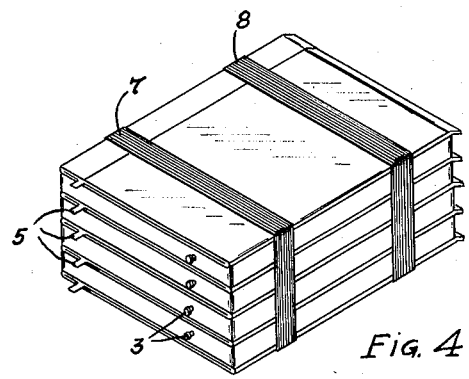
Figure 5:
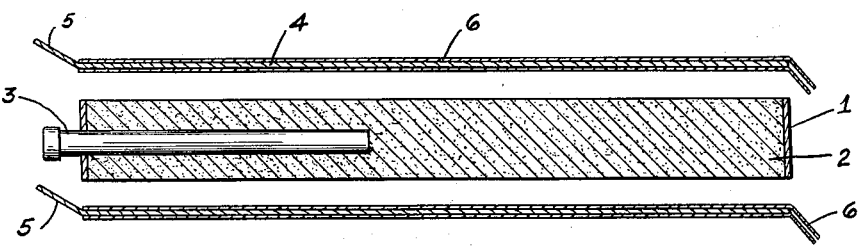
Figure 6:
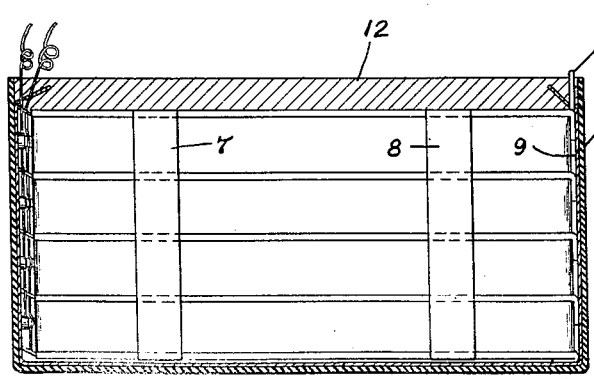
Figure 7:
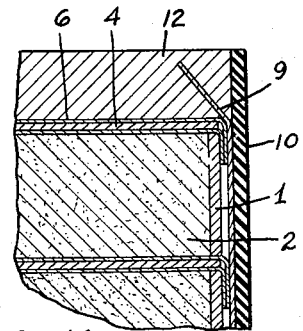

Further and more limited objects of the invention will appear as the description proceeds and by reference to the accompanying drawing in which Fig. 1 is a perspective view of my improved battery unit; Fig. 2 is a perspective view of the mix cake which forms a part of each cell; Fig. 3 is a perspective view of one of the zinc electrodes after it is wrapped in an envelope of battery paper; Fig. 4 is a perspective view of the stack of cells before the same is inserted within the outer casing; Fig. 5 is a vertical sectional view with the parts partially disassembled to more clearly illustrate the construction; Fig. 6 is a vertical sectional view on the line 6—6 of Fig. 1; and Fig. 7 is a fragmentary detail sectional view, the scale being exaggerated to more clearly illustrate the construction.

Referring now to the drawing, the reference character 1 designates a retainer formed of fish paper or other suitable material and which receives therein a mass of depolarizing mix 2 and a carbon electrode 3. Disposed above and below each mass of mix is a flat zinc electrode 4 having at one side thereof a tab 5 and which is wrapped in an envelope of battery paper indicated by the reference character 6. The cells are arranged in stacked relation as shown in Fig. 4 and are secured in contact with each other by means of strips of tape 7 and 8. The cells are then connected in parallel, as shown in Fig. 6, and the stack of cells is then wrapped in a thin layer of Pliofilm 9 and inserted into an outer carton 10. Preferably arranged at one corner of the outer carton and disposed within the layer of Pliofilm but projecting outwardly therefrom is a small piece of porous wood 11 which may be in the form of a toothpick. A hard seal 12 is then poured over the top of the stack of cells as shown in Fig. 6, and which forms a liquid tight seal with the adjacent edges of the Pliofilm. It will be noted that all of the cells are hermetically sealed within the layer of Pliofilm and that excessive pressure may escape through the toothpick without permitting the liquid contents of the cell to escape therethrough or the ingress of outside air.

Pliofilm is hydrochlorinated rubber, that is, rubber to which hydrogen chloride has been added. Pliofilm is strong and somewhat stretchable, tear-resistant and impervious to moisture and gas and resistant to oil and hydrocarbons. Pliofilm has the quality of being sealed by fusion when heat is applied thereto. Other materials having the desirable qualities of Pliofilm may of course be used. The thickness of a layer of Pliofilm is approximately $2/1000$ of an inch. It therefore occupies very little space which permits the use of a maximum quantity of active materials. It will be noted further that there is a zinc electrode disposed on opposite sides of each mass of mix so that both sides of the zinc plate are used which reduces the amount of zinc required in any particular battery unit.

It will of course be understood that I may use any desired number of cells and that the cells may be of any desired size or shape. Various other changes may be made in the shape, size and arrangement of parts as well as in the specific materials used without departing from the spirit of my invention. It is therefore to be understood that the invention is limited only in accordance with the scope of the appended claims.

Having thus described my invention, what I claim is:

1. A dry cell battery unit comprising a plurality of dry cells arranged in stacked relation and connected in parallel, each cell comprising a mass of mix containing a carbon electrode, a zinc electrode disposed over each mass of mix and having substantially the same surface area and being enclosed within a thin layer of battery paper, each zinc electrode having a projecting tab thereon, a thin, continuous, layer of Pliofilm or the like enclosing and sealing the stack of cells, and vent means extending from between said layer and stack to a point outside of the battery for relieving excessive pressure throughout the entire stack but preventing escape of the liquid contents of the battery unit.

2. A dry cell battery unit comprising a plurality of dry cells arranged in stacked relation and connected in parallel, each cell comprising a mass of mix containing a carbon electrode, a zinc electrode disposed over each mass of mix and having substantially the same surface area and being enclosed within a thin layer of battery paper, each zinc electrode having a projecting tab thereon, a thin, continuous layer of pliofilm enclosing and sealing the stack of cells, vent means for relieving excessive pressure but preventing escape of the liquid contents of the battery unit, an outer carton enclosing said stack of cells, and a seal closing said outer carton and fused with said layer of Pliofilm, said vent means extending through said seal and between said layer and stack.

3. A dry cell battery unit comprising a plurality of dry cells arranged in stacked relation and connected in parallel, each cell comprising a mass of mix enclosed within a retainer and containing a carbon electrode projecting from an edge thereof through said container, a flat zinc electrode disposed over each mass of mix and having substantially the same surface area as the mass of mix and being wrapped in a layer of battery paper, means holding all of said cells in intimate contact under pressure, a single, continuous layer of Pliofilm enveloping and sealing the stack of cells, an outer carton enclosing the entire stack of cells, a seal closing the outer carton and vent means for relieving excessive pressure within the unit and without permitting ingress of outside air or the escape of the liquid contents of the unit.

4. A dry cell battery unit comprising a plurality of dry cells arranged in stacked relation and connected in parallel, each cell comprising a mass of mix containing a carbon electrode projecting from an edge thereof, a zinc electrode disposed over each mass of mix and having substantially the same surface area and being enclosed within a thin layer of battery paper, a single, continuous thin layer of material having substantially the qualities and characteristics of Pliofilm enclosing and sealing the entire stack of cells, vent means comprising a porous fibrous stick projecting into said battery between the stack and the enclosing layer for relieving excessive pressure but preventing escape of the liquid contents of the battery unit, an outer carton enclosing said stack of cells, and a seal closing said outer carton and fused with said layer of material.

5. A dry cell battery comprising a plurality of dry cells arranged in stacked relation and connected in parallel, each cell comprising a mass of mix containing a carbon electrode, a zinc electrode disposed over each mass of mix and being enclosed within a layer of battery paper, said battery paper projecting beyond one end of the zinc electrode, each zinc electrode having a tab projecting therefrom at the end thereof opposite to the end from which the battery paper projects, and a thin flexible layer of impervious material extending around and enclosing the stack of cells, said tabs and projecting battery paper spacing the ends of the zinc electrodes from said enclosing material, and a vent communicating with said space.

CYRIL P. DEIBEL.